United States Patent
Wheeler

[11] Patent Number: 5,988,957
[45] Date of Patent: Nov. 23, 1999

[54] QUICK CLAMP

[75] Inventor: Thomas J. Wheeler, Baltimore, Md.

[73] Assignee: Black & Decker Inc., Newark, Del.

[21] Appl. No.: 09/218,268

[22] Filed: Dec. 21, 1998

[51] Int. Cl.[6] ...................................................... B23B 31/22
[52] U.S. Cl. .......................... 408/239 R; 279/30; 279/75; 279/905; 409/234
[58] Field of Search ................................ 408/239 R, 240; 279/22, 30, 75, 905; 409/232, 234

[56] References Cited

U.S. PATENT DOCUMENTS

| | | |
|---|---|---|
| 2,069,527 | 2/1937 | Kirkland . |
| 2,290,215 | 7/1942 | Stenberg . |
| 2,662,773 | 12/1953 | Parsons . |
| 3,436,086 | 4/1969 | Glenzer . |
| 3,529,842 | 9/1970 | Benjamin et al. . |
| 3,674,281 | 7/1972 | Hedrick . |
| 3,720,417 | 3/1973 | Smith . |
| 3,756,737 | 9/1973 | Smith . |
| 3,851,890 | 12/1974 | Smith . |
| 3,893,677 | 7/1975 | Smith . |
| 3,975,032 | 8/1976 | Bent et al. . |
| 4,171,821 | 10/1979 | Miller . |
| 4,184,692 | 1/1980 | Benson et al. . |

(List continued on next page.)

FOREIGN PATENT DOCUMENTS

| | | |
|---|---|---|
| 6-134608 | 5/1994 | Japan . |
| 1144793 | 3/1985 | U.S.S.R. . |
| 8248 | 2/1910 | United Kingdom . |
| 636021 | 4/1950 | United Kingdom . |
| 664443 | 1/1952 | United Kingdom . |
| WO 96/19677 | 6/1996 | WIPO . |
| WO 97/25542 | 7/1997 | WIPO . |
| WO 97/27020 | 7/1997 | WIPO . |
| WO 97/49514 | 12/1997 | WIPO . |
| WO 98/25034 | 6/1998 | WIPO . |
| WO 98/29212 | 7/1998 | WIPO . |
| WO 98/30365 | 7/1998 | WIPO . |

*Primary Examiner*—Steven C. Bishop
*Attorney, Agent, or Firm*—Harness, Dickey & Pierce, P.L.C.

[57] ABSTRACT

A power tool with a quick release tool holder has a spindle with a central bore to receive a tool, a first aperture and second aperture extend into the central bore. A ball is in each of the first apertures. The ball locks the tool against axial movement. An elongated roller is in each of the second apertures. The roller prohibits rotation of the tool within the spindle. A first sleeve is fixed with the spindle. The first sleeve maintains the rollers in the apertures. A biasing member axially biases the rollers. A second sleeve is circumferentially positioned about the spindle and axially movable on the spindle. The second sleeve has a surface in contact with the balls. Also, a biasing member is provided to provide a force on the second sleeve such that the sleeve is moved against the force of the spring to enable insertion or removal of the tool.

23 Claims, 2 Drawing Sheets

U.S. PATENT DOCUMENTS

| | | |
|---|---|---|
| 4,188,041 | 2/1980 | Soderberg . |
| 4,273,344 | 6/1981 | Benson et al. . |
| 4,290,617 | 9/1981 | Yoshida . |
| 4,395,051 | 7/1983 | Tonomura . |
| 4,626,152 | 12/1986 | Palm . |
| 4,692,073 | 9/1987 | Martindell . |
| 4,710,079 | 12/1987 | Smith et al. . |
| 4,795,291 | 1/1989 | March . |
| 4,828,277 | 5/1989 | De Bastiani et al. . |
| 4,858,939 | 8/1989 | Riggs . |
| 4,946,179 | 8/1990 | De Bastiani et al. . |
| 4,989,887 | 2/1991 | Jordan . |
| 5,188,378 | 2/1993 | Erlenkeuser . |
| 5,193,825 | 3/1993 | Kanaan et al. . |
| 5,314,198 | 5/1994 | Kanaan . |
| 5,354,075 | 10/1994 | Marik et al. . |
| 5,411,275 | 5/1995 | Huff et al. . |
| 5,464,229 | 11/1995 | Salpaka . |
| 5,511,801 | 4/1996 | Kanaan et al. . |
| 5,531,461 | 7/1996 | Huff et al. . |
| 5,573,255 | 11/1996 | Salpaka . |
| 5,577,743 | 11/1996 | Kanaan et al. . |
| 5,586,847 | 12/1996 | Mattern, Jr. et al. . |
| 5,678,961 | 10/1997 | Fleege et al. . |
| 5,704,616 | 1/1998 | Huff et al. . |
| 5,755,448 | 5/1998 | Kanaan et al. . |
| 5,775,704 | 7/1998 | Wilson et al. . |
| 5,788,248 | 8/1998 | Gibson . |
| 5,810,366 | 9/1998 | Montjoy et al. . |
| 5,816,583 | 10/1998 | Middleton . |
| 5,820,135 | 10/1998 | Han et al. . |
| 5,820,136 | 10/1998 | Han et al. . |

QUICK CLAMP

BACKGROUND OF THE INVENTION

The present invention relates to tool holders and, more particularly, to tool holders which enable a quick release tool to be retained in the holder.

Various types of tool retainers exist in the art. Several of the tool holders enable the tool to be easily retained and easily removed from the holder. While the tool holders appear to function satisfactorily for their intended purpose, designers strive to improve the art. Thus, it is desirable to provide a tool holder which provides strong retention and easy removal. Also, the tool holder should retain a cylindrical bit within the holder against movement in both axial and circumferential directions.

SUMMARY OF THE INVENTION

Accordingly, it is an object of the present invention to provide the art with a quick release tool holder which enables quick retention and removal of a tool from the holder. The present invention provides the art with a tool holder that prohibits cylindrical tools from being axially and/or circumferentially moved while held within the tool holder. Also, the present invention enables insertion and removal of the tool with the moving of a sleeve.

In accordance with one aspect of the invention, a quick release tool holder comprises a spindle with a central bore to receive a tool. At least one first aperture is present in the spindle. The aperture extends into the central bore. Also, at least one second aperture, axially positioned with respect to the at least one first aperture, is present in the spindle. The second aperture extends into the central bore. A ball is positioned in each of the at least one first apertures. The ball locks the tool against axial movement. An elongated roller is positioned in each of the at least one second apertures. The rollers prohibit rotational or circumferential movement of the tool within the spindle. A first sleeve is fixed to the spindle to maintain the at least one elongated roller in the second aperture. The first sleeve has a surface in contact with the at least one elongated roller. A biasing member axially biases the at least one elongated roller. A second sleeve is axially movable and circumferentially positioned about the spindle. The second sleeve has a surface in contact with the at least one ball. A further biasing member is provided to enable biasing of the second sleeve on the spindle. The elongated roller may be tapered and have an elliptical cross-section. The contact surface of the first sleeve may be tapered. Also, an envelope is formed behind the second aperture to receive the biasing member around the spindle. The second sleeve circumferentially surrounds the first sleeve and its contact surface is also tapered.

In accordance with a second embodiment of the present invention, a power tool comprises a housing, a motor in the housing with the motor coupled to a power source. An activation member to activate the motor is also coupled with the tool. A spindle is coupled with the motor. A tool holder is coupled with the spindle. At least one first aperture is present in the spindle. The at least one aperture extends into the central bore. Also, at least one second aperture, axially positioned with respect to the at least one first aperture, is present in the spindle. The second aperture extends into the central bore. A ball is positioned in each of the at least one first apertures. The ball locks the tool against axial movement. An elongated roller is positioned in each of the at least one second apertures. The rollers prohibit rotational or circumferential movement of the tool within the spindle. A first sleeve is fixed to the spindle to maintain the at least one elongated roller in the second aperture. The first sleeve has a surface in contact with the at least one elongated roller. A biasing member axially biases the at least one elongated roller. A second sleeve is axially movable and circumferentially positioned about the spindle. The second sleeve has a surface in contact with the at least one ball. A further biasing member is provided to enable biasing of the second sleeve on the spindle. The elongated roller may be tapered and have an elliptical cross-section. The contact surface of the first sleeve may be tapered. Also, an envelope is formed behind the second aperture to receive the biasing member around the spindle. The second sleeve circumferentially surrounds the first sleeve and its contact surface is also tapered.

In accordance with a third aspect of the invention, a quick release tool holder comprises a spindle with a central bore, a plurality of apertures for receiving balls in each aperture, a plurality of slots in the spindle to receive an elongated roller in each slot, and the apertures and the slots extending into the central bores. The balls and the rollers project into the central bore. A biasing member axially biases the rollers. A first sleeve is coupled with the spindle and surrounds the rollers. The first sleeve has an interior contact surface in contact with the rollers. A second sleeve surrounds the spindle and has a contact surface to contact the plurality of balls. A stop is positioned on the spindle adjacent a free end of the spindle. A spring is positioned about the spindle between the stop and the second sleeve contact surface to bias the sleeve in position on the plurality of balls. Also, the second sleeve is axially moved against the spring to enable removal and insertion of the tool. The elongated rollers are tapered and have an elliptical cross-section. The first sleeve contact surface is also tapered. An envelope to receive the biasing member is formed between the first sleeve and the spindle axially behind the spindle slots. Also, the contact surface of the second sleeve is tapered. An O-ring surrounds the axial bore adjacent the free end of the spindle to assist in preventing dust from entering the tool holder.

From the following detailed description, taken in conjunction with the drawings and subjoined claims, other objects and advantages of the present invention will become apparent to those skilled in the art.

BRIEF DESCRIPTION OF THE DRAWINGS

The accompanying drawings, which are incorporated herein and constitute a part of the specification, illustrate one embodiment of the invention and together with the description serve to explain the principles of the invention. In the drawings, the same reference numeral indicates the same part.

DETAILED DESCRIPTION OF THE PREFERRED EMBODIMENT

Figure 1:
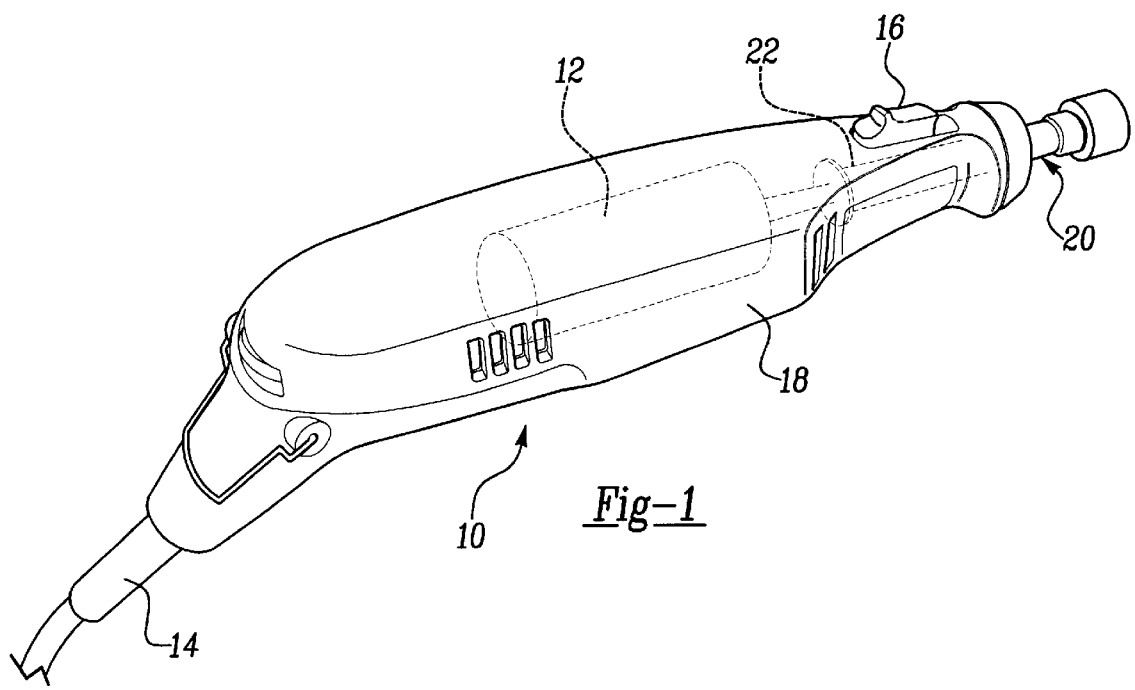
FIG. 1 is a side elevation view of a power tool with the tool holder of the present invention.

Turning to the figures, particularly FIG. 1, a power tool is illustrated and designated with the reference numeral 10. The power tool 10 is a rotary tool including a motor 12 which may be energized by a battery or cord 14. An activation button 16 enables the power tool to be energized and rotates the motor 12. The motor 12 and electrical connections between the activation button 16 and power source 14 are enclosed by a housing 18. A tool holder 20 is also coupled with the power tool 10.

The tool holder 20 includes a spindle 22 which is coupled with the motor 12. The spindle 22 includes an axial bore 24 which extends from a free end 26 a desired distance into the spindle 22. The axial bore has a desired diameter to enable rotary tools with cylindrical shafts with circular cross-sections 28 to be positioned within the bore 24.

The spindle includes a first plurality of apertures 30 which receive balls 32. The apertures 30 extend into the central bore 24 to enable the balls 32 to project within the bore. The balls 32, when a tool 28 is positioned within the tool holder 20, prohibit axial movement of the tool 28 within the bore 24.

The spindle 22 includes a plurality of slots 34 which receive elongated rollers 36. The slots 34 are positioned axially behind the apertures 30. The slots 34 extend into the central bore 24 which enables the elongated rollers 36 to project into the central bore 24. The elongated rollers 36 prohibit rotational movement of the tool 28 within the bore 24.

The spindle 22 also includes an envelope 38 positioned directly behind a continuous width the slots 34. The envelope 38 houses a springs 40 which bias the rollers 36 in an axial direction. The springs 40 are positioned within the envelope 38 so that they apply substantially equal force onto each of the rollers 36. Likewise, a single spring may be utilized. The rollers 36, in turn, provide substantially equal locking force onto the tool 28 to prohibit rotational movement of the tool 28.

Figure 2:
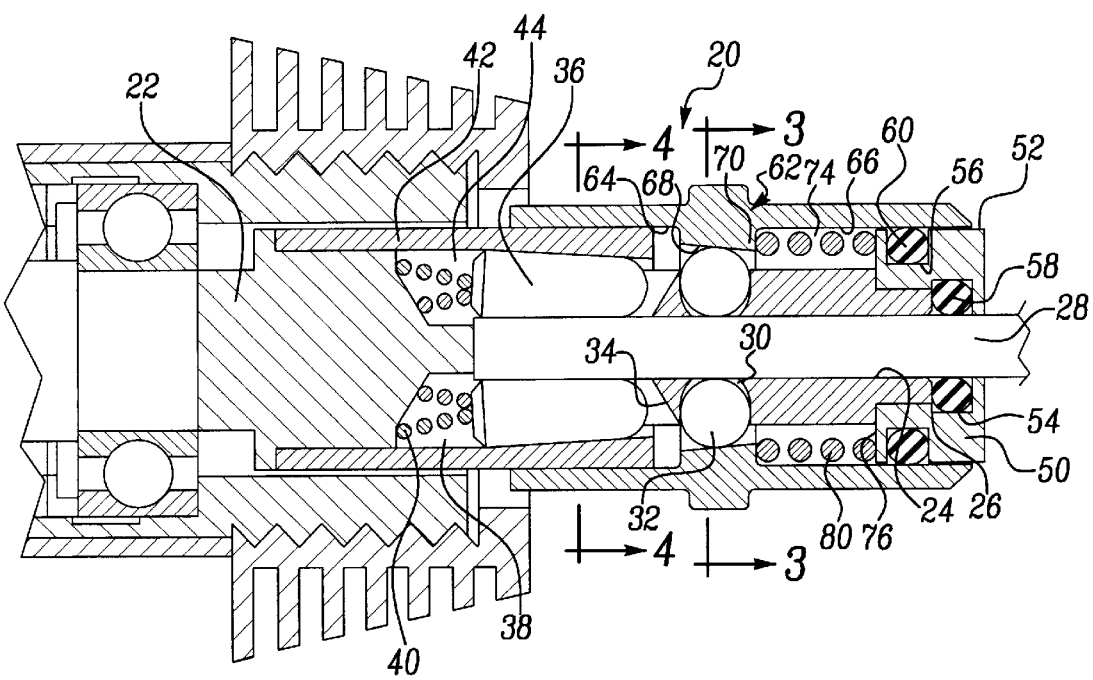
FIG. 2 is a longitudinal section view of FIG. 1 along line II—II thereof.
Figure 3:
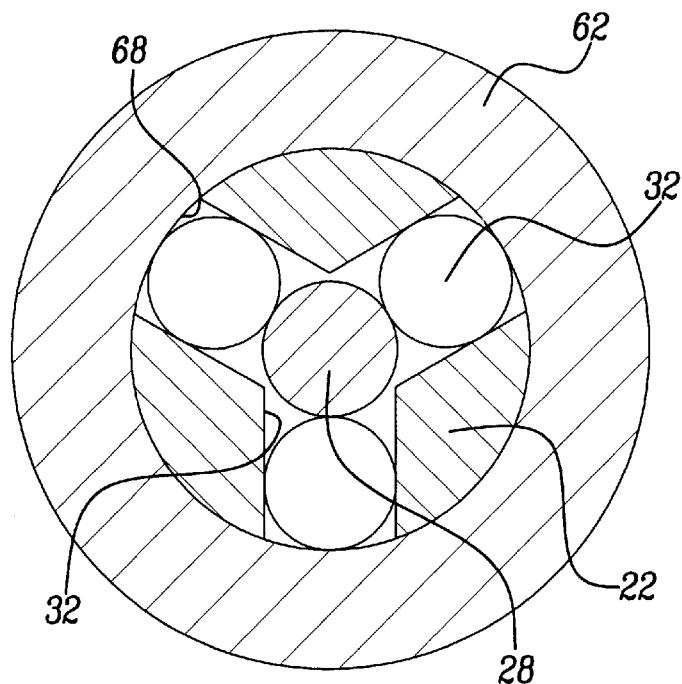
FIG. 3 is a cross-section view of FIG. 1 along line III—III thereof.
Figure 4:
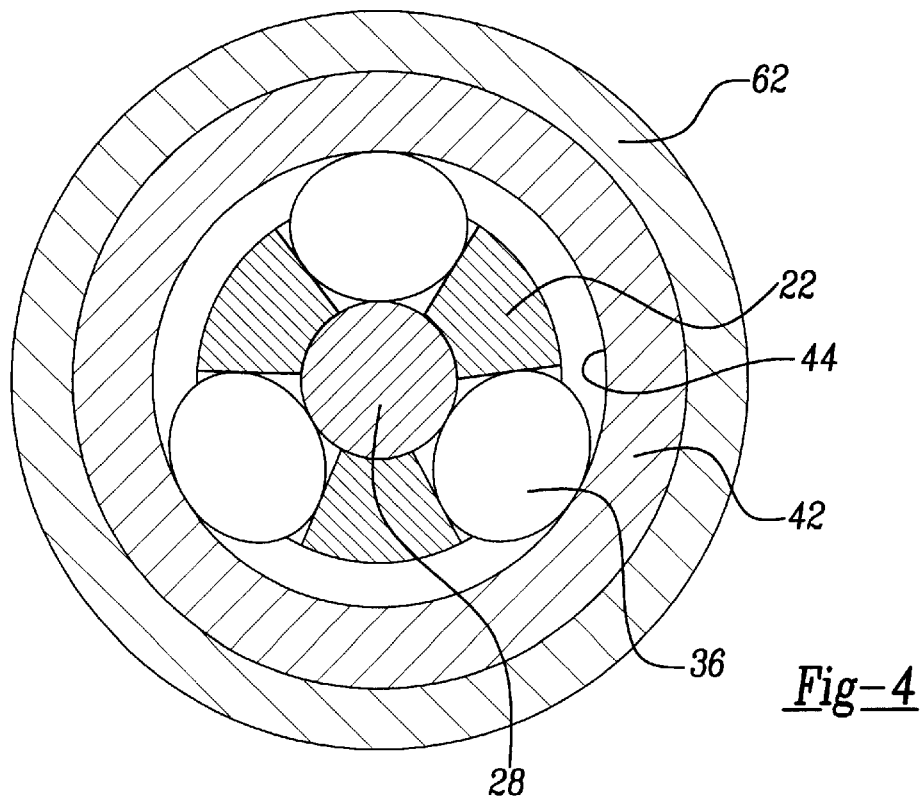
FIG. 4 is a cross-section view of FIG. 1 along line IV—IV thereof.

The elongated rollers 36 are tapered in the axial direction as illustrated in FIG. 2. The taper enables a line contact with the tool. Also, the taper enables the rollers to be urged forward towards the free end 26 of the spindle when the rollers are in a locking condition. The rollers 36 include an elliptical cross-section as illustrated in FIG. 4. The curve of the ellipse is such that when the tool is positioned within the axial bore 24, the tool easily slides into the axial bore. However, if the tool shaft 28 begins to rotate, the rollers initiate rotation, however, due to the elliptical cross-sections, they soon bind between the tool shaft 28 and the outer sleeve 42. Thus, the rollers 36 lock the tool shaft 28 against rotary movement.

The sleeve 42 is fixed onto the spindle 22. The sleeve 42 abuts a stop on the spindle which prohibits further insertion of the sleeve onto the spindle. The sleeve has an interior surface 44. The interior surface 44 is tapered at one end to correspond to the taper of the rollers 36. Thus, the tapered surfaces of the rollers and interior surface 44 maintain the rollers within the slots of the spindle 22.

An annular end piece 50 is positioned on the free end of the spindle 22. The end piece 50 provides a sliding surface 52. Also, the end piece 50 includes cutouts 54 and 56 which house O-rings 58 and 60. The O-ring 58 contacts the rotary tool shaft 28 to prohibit dust or debris from entering into the axial bore 24. The O-ring 60 is in contact with outer sleeve 62 to prevent vibration of the sleeve 62.

The outer sleeve 62 includes interior surfaces 64 and 66 as well as contact surface 68. The inner surfaces 64 and 66 have a diameter such that they enable the sleeve to slide along the outer surface of the sleeve 42 and the outer surface of the end piece 50, respectively. The contact surface 68 is tapered and applies force onto the balls 32. A boss 70 is formed between the surfaces 64 and 66 and includes the tapered surface 68.

A pocket 74 is formed between the outer surface of the spindle 22, the interior surface 66 of the sleeve 62, the boss 70, and the end 76 of the end piece 50. The pocket 74 receives a spring 80 which acts on the sleeve boss 70. The spring 80 provides a force which enables movement of the outer sleeve 62 to enable insertion and removal of the tool shank 28 from the axial bore 24. Thus, as the sleeve 62 is moved forwardly or to the left in the drawing, the tool shank 28 is easily inserted into the axial bore 24. Also, the sleeve 62 is moved forwardly or to the left to enable removal of the tool shank 28 from the axial bore 24.

The tapered surface 68 applies a force on the balls 32 to retain the tool shaft 28 within the cylindrical bore 24. The balls 32 apply a point contact force onto the shaft 28 to prohibit axial movement of the tool shank 28 in the axial bore 24. As the tool shaft 28 attempts to exit the axial bore 24, the balls 32 begin to rotate. As the balls 32 begin to rotate, they rotate against the tapered surface 68 in an attempt to roll towards a smaller diameter portion of the taper. As this occurs, the balls 32 bind, fixing the shaft 28 against axial movement.

Thus, the present invention provides a quick release tool holder which applies a force for prohibiting axial movement and a force prohibiting rotational movement of the tool shank within the holder. The tool holder outer sleeve is easily movable to enable insertion and removal of the tool from the spindle axial bore.

While the above detailed description describes the preferred embodiment of the present invention, the invention is susceptible to modification, variation, and alteration without deviating from the scope and fair meaning of the subjoined claims.

I claim:

1. A quick release tool holder, comprising:

a spindle having a central bore for receiving a tool, at least one first aperture in said spindle extending into said central bore, at least one second aperture axially positioned with respect to said at least one first aperture and extending into said central bore;

a ball in each of said at least one first apertures, said ball for locking the tool against axial movement;

an elongated roller in each of said at least one second aperture, said roller for prohibiting rotation of said tool in said spindle;

a first sleeve fixed with said spindle for maintaining said at least one elongated roller in said aperture, said first sleeve having a surface in contact with at least one elongated roller;

a biasing member axially biasing said at least one elongated roller;

a second sleeve axially movable on and circumferentially positioned about said spindle, said second sleeve having a surface in contact with said at least one ball;

biasing member for biasing said second sleeve on said spindle.

2. The quick release tool according to claim 1, wherein said elongated roller being tapered.

3. The quick release tool according to claim 1, wherein said first sleeve contact surface being tapered.

4. The quick release tool according to claim 1, wherein an envelope for receiving said biasing member is formed between said first sleeve and said spindle axially behind said at least one second aperture.

5. The quick release tool according to claim 1, wherein said second sleeve contact surface being tapered.

6. The quick release tool according to claim 1, wherein said second sleeve circumferentially surrounds a portion of said first sleeve.

7. The quick release tool according to claim 1, wherein said holder includes a plurality of first apertures, second apertures, balls and elongated rollers.

8. The quick release tool according to claim 1, wherein said elongated roller having an elliptical cross-section.

9. A power tool, comprising:

a housing;

a motor in said housing;

a power source coupled with said motor for energizing said motor;

an activation member for activating said motor;

a spindle coupled with said motor; and a tool holder coupled with said spindle, said spindle having a central bore for receiving a tool, at least one first aperture in said spindle extending into said central bore, at least one second aperture axially positioned with respect to said at least one first aperture and extending into said central bore;

a ball in each of said at least one first aperture, said ball for locking the tool against axial movement;

an elongated roller in each of said at least one second aperture, said roller for prohibiting rotation of said tool in said spindle;

a first sleeve fixed with said spindle for maintaining said at least one elongated roller in said aperture, said first sleeve having a surface in contact with at least one elongated roller;

a biasing member axially biasing said at least one elongated roller;

a second sleeve axially movable on and circumferentially positioned about said spindle, said second sleeve having a surface in contact with said at least one ball; and a biasing member for biasing said second sleeve on said spindle.

10. The quick release tool according to claim 9, wherein said elongated roller being tapered.

11. The quick release tool according to claim 9, wherein said first sleeve contact surface being tapered.

12. The quick release tool according to claim 9, wherein an envelope for receiving said biasing member is formed between said first sleeve and said spindle axially behind said at least one second aperture.

13. The quick release tool according to claim 9, wherein said second sleeve contact surface being tapered.

14. The quick release tool according to claim 9, wherein said second sleeve circumferentially surrounds a portion of said first sleeve.

15. The quick release tool according to claim 9, wherein said holder includes a plurality of first apertures, second apertures, balls and elongated rollers.

16. The quick release tool according to claim 9, wherein said elongated roller having an elliptical cross-section.

17. A quick release tool holder comprising:

a spindle having a central bore;

a plurality of apertures receiving a ball in each aperture;

a plurality of slots in said spindle, said plurality of slots receiving an elongated roller in each slot, said apertures and slots extending into said central bore for enabling said balls and rollers to project into said central bore;

a biasing member for axially biasing said rollers;

a first sleeve coupled with said spindle and surrounding said rollers, said first sleeve having an interior contact surface in contact with said rollers;

a second sleeve surrounding said spindle, said second sleeve having a contact surface contacting said plurality of balls;

a stop on said spindle adjacent a free end of the spindle; and a spring positioned about said spindle between said stop and second sleeve contact surface for biasing said sleeve in position on said plurality of balls and wherein said second sleeve is axially moved against said spring for enabling removal and insertion of a tool from said axial bore.

18. The quick release tool according to claim 17, wherein said elongated roller being tapered.

19. The quick release tool according to claim 17, wherein said first sleeve contact surface being tapered.

20. The quick release tool according to claim 17, wherein an envelope for receiving said biasing member is formed between said first sleeve and said spindle axially behind said at least one second aperture.

21. The quick release tool according to claim 17, wherein said second sleeve contact surface being tapered.

22. The quick release tool according to claim 17, wherein said elongated roller having an elliptical cross-section.

23. The quick release tool according to claim 17, wherein an O-ring surrounds the axial bore adjacent the free end of the spindle.

* * * * *